Feb. 2, 1932.    C. N. FAIRCHILD    1,843,114
CLUTCH LOCK
Filed Sept. 15, 1928
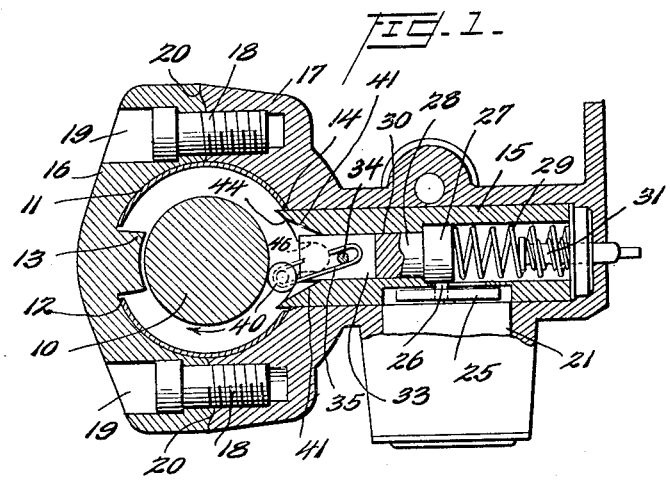
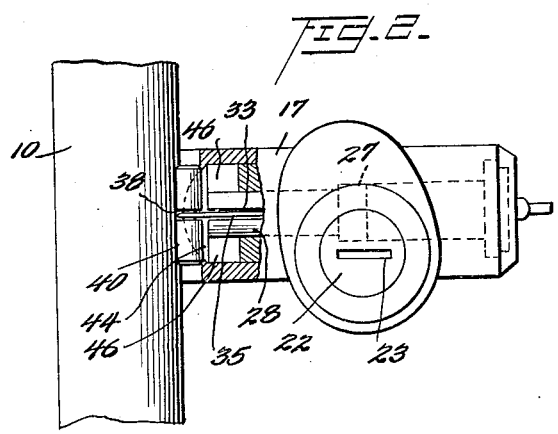
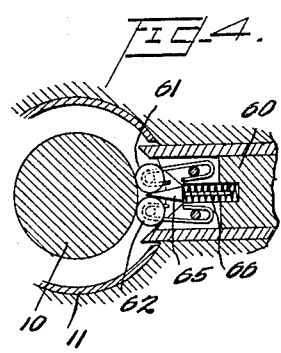
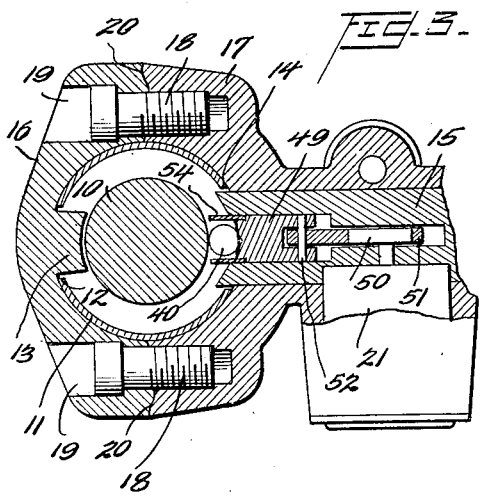
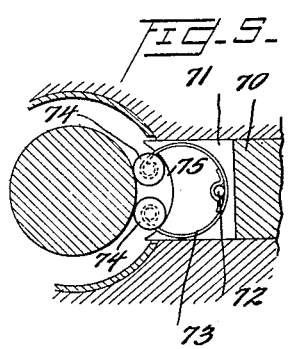
Inventor
Charles N. Fairchild
By H. H. Snelling
Attorney Patented Feb. 2, 1932

1,843,114

UNITED STATES PATENT OFFICE

CHARLES N. FAIRCHILD, OF NEW HAVEN, CONNECTICUT, ASSIGNOR TO FAIRCHILD LOCK CORPORATION, OF NEW YORK, N. Y., A CORPORATION OF DELAWARE

CLUTCH LOCK

Application filed September 15, 1928. Serial No. 306,143.

This invention relates to clutch locks and has for its principal object the provision of a positive lock for preventing a shaft from turning in at least one direction.

A further object of the invention is the provision of a lock for preventing rotation of a cylindrical shaft in such manner as to be effective without marring the shaft and in which unauthorized withdrawal of the clutch is prevented.

A further but quite important object of the invention is the provision of a steering post lock in which a ball or roller is substituted for the usual locking bolt thereby eliminating the need for weakening the steering post, or adding anything to it.

In the past it has been fully appreciated that it would be best not to cut into the steering post to lock the steering wheel against turning but the attempts to obviate the marring of the post have not been fully successful as the only efficient schemes have contemplated the securing to the post or tube of a collar which latter could be indented, roughened or otherwise provided with a bolt receiving means. The presence of a collar is naturally objectionable and furthermore it increases the size of the lock housing. The present invention in its preferred form contemplates the provision of a simple fairly small steering post lock housing in which the gripping member is a detent which term is used in the specification in its broad dictionary meaning, that is, that which locks or unlocks a movement. Where the word rolling detent is used this term means an object a cross section of which is a circle for example a cylinder, a sphere or any solid of generation.

In the drawings I have shown a preferred model as it is now used but I do not wish to be limited to this specific embodiment as the invention has a much wider range of use and can be applied to any sort of rotating body. While in my preferred lock, the one that is actually in use, I have only one roller, I may use two as shown in one modification and I may at times eliminate entirely all springs and have the detent move into and out of engagement by an absolutely positive action such as a circular eccentric as shown in the other modification. In any of the forms I may alter the device slightly so as to provide for free forward rotation while preventing reverse rotation altho generally my devices are primarily intended to prevent all rotation.

In the drawings:—

Figure 1 is a cross section taken at right angles to the steering tube.

Figure 2 is a side view showing the steering shaft or tube in elevation.

Figure 3 is a modified form having no springs.

Figure 4 is a still further modification in which the bolt is enlarged and carries two detents.

Figure 5 is a further modification differing from that of Figure 4 only in the detent separating means.

In Figure 4, 10 is a steering shaft of any preferred form being either a tube or rod depending upon the make of the car. The steering post casing 11 is likewise a standard piece of equipment but is shown as provided with a circular opening 12 to receive the boss or anvil 13 of the lock housing and with a nearly diametrically opposed circular opening 14 to receive what is technically known as the cartridge 15. The small portion of the lock housing, some times called the cap piece, is numbered 16 in the drawings and is secured to the larger portion 17 of the lock housing by means of one way screws 18 the heads of which seat deep in the bore of the cap piece and after the housing is fastened on the steering post casing the recesses 19 thru which the heads of the screws 18 have passed are filled with metal to preserve a smooth and unbroken appearance. This means of securing the two parts of the housing together is old as is likewise the corrugated meeting faces 20 illustrated.

21 denotes the barrel of a lock preferably of the plunger or disk type, 22 representing the revolving cylinder and 23 highly diagrammatically representing by the key slot. A cam 25 fast to the revolving cylinder of the lock engages a small pin 26 projecting from the head 27 of the slide 28, this member ordinarily being the locking bolt. Rotation of the lock causes the cam 25 to lift the slide 28 against the downward urge of its spring 29 withdrawing the slide into the bore 30 of the cartridge 15 sufficiently far to permit the head 27 to engage a stem 31 which is spring pressed downwardly and is the movable portion of an ignition switch. The switch itself is not illustrated but is of any conventional type performing no new function.

The slide 28 is cylindrical and has a flat bottom surface. It is, however, centrally and longitudinally slotted as at 33 and thru this transverse slot is passed a retaining pin 34 which anchors a link 35 the lower or free end of which is received within a groove 38 of a detent 40 here illustrated as a cylindrical roller.

The cartridge 15 differs from usual practice in its lower end only where it is slotted as at 41 in line with the slot 33 of the slide 28 and for the same purpose, to receive the link 35. At either side of the center line the cartridge has a lower arcuate wedging surface 44 so that the arc of the curved surface of the steering post or tube 10 forms with the curved surface 44 a wedging chamber into which the rolling detent 40 is carried by rotation of the steering post toward such curved surface 44. The lower end of the cartridge is also recessed as at 46 to receive the detent when the slide 28 is moved upwardly as in Figure 1 against its spring 29, the cartridge of course being fixed to the casing 17.

The operation of the device is as follows:— The driver finds the car when parked with the device as illustrated in Figure 1. Should he turn the steering wheel so as to move the steering post 10 in the direction of the arrow he would simply wedge the detent against the right hand curved wall 44 of the cartridge which may be considered as an integral part of the casing. The anvil 13 supports the tube or rod against bending and it is therefore impossible to move the steering wheels further in that direction. The steering wheel may however be turned in the opposite direction but only thru a very small angle, that is, until the rolling detent 40 engages the curved upper wall 44 of the left wedging chamber. The action is quite positive because the spring 29 is powerful and the locking bolt or slide 28 constantly rests against the ball or roller 40 when in locked position thereby holding it firmly against the steering post 10 and making it impossible to turn the steering post by repeated forward and backward jerks since in this particular case the rolling contact between the detent and the rotating shaft is firm and the area of contact between the roller and post is very materially greater than the area of contact between the roller and the slide.

In the modified form shown in Figure 3 the rolling detent 40 does not engage the cartridge wall but binds against the slide 49 which is not spring pressed but has a positive movement from the disk 50 which is eccentrically mounted on the revolving barrel of the lock. The eccentric strap 51 is of any well known type and is pivoted to the slide 49 as by the pin 52. In this case the longitudinal movement of the slide 49 is very slight, just enough to avoid any binding action. A small tube 54 is secured to the bottom of the slide and serves merely to prevent loss of the rolling detent when the slide with its two wedging surfaces is raised. I prefer to have a slight amount of play altho with a considerable amount of precision this can be reduced to an almost inappreciable amount.

In Figure 4 the slide 60 is somewhat larger and carries twin rollers 61 and 62 held by links 63 and constantly urged away from each other and into wedging position by a tapered member 65 resiliently held in operative engagement by spring 66. In this modification the movement of the slide will preferably be positive as in Figure 3. The slide is moved upwardly just sufficiently to insure that the rollers shall not engage the steering post under any circumstances when in unlocked position. In Figure 5 the slide 70 is slotted as at 71 and a transverse pin 72 is placed to anchor a spring 73 which serves constantly to urge the rollers 74 apart and into engagement with the curved walls 75 of the slide 70. In this modification the slide may be either spring pressed as in Figure 1 or positively moved as in Figure 3.

What I claim is:

1. In a steering post lock for automobiles of the type in which a revolving cylinder lock operates a plunger movable radially of the steering post, a detent carried by the plunger, a portion of the lock housing being provided with a curved surface cooperating with the steering post to form a wedging chamber into which the detent is moved by the turning of the steering post in one direction.

2. In a steering post lock, a steering post, a casing stationary with respect to the steering post and having two opposed surfaces forming with the surface of the steering post a pair of wedging chambers, a detent movable out of and into contact with the steering post to be moved by the steering post into wedging engagement with one or the other of the wedging chambers by rotation of the steering post, and lock controlled means for holding the detent in such position to prevent rotation of the steering post in either direction.

3. In a device for locking a rotary shaft against turning, relatively fixed means forming with the surface of said shaft a plurality of wedging chambers, detent means movable into and out of position to wedge the shaft against the relatively fixed means so as to prevent forward rotation when the detent means and the walls of one wedging chamber are in contact and to prevent reverse rotation when the detent means and the walls of the other wedging chamber are in contact, and means for locking the detent means in such rotation preventing position.

4. In a device for locking a rotary shaft against turning, a member spaced from the rotary shaft and having two surfaces each diverging from the surface of the shaft and forming therewith a pair of opposed wedging chambers, a detent adapted to contact with the surface of the shaft and to be moved by such contact into wedging relation to one or the other of the wedging chambers depending upon the direction of rotation of the shaft, means for causing relative movement of the detent and the walls of the wedging chamber so as to prevent all wedging action, the said detent being movable out of contact with the rotating shaft and means for locking the parts in free or in wedging position.

5. In a steering post lock for automobiles of the type in which a revolving cylinder lock operates a plunger movable radially of the steering post, said plunger having a surface cooperating with the steering post to form a wedging chamber, a detent within said chamber, and means at the bottom of the plunger to prevent the loss of said detent when the plunger is moved radially from said steering post.

6. In a steering post lock for automobiles of the type in which a revolving cylinder lock operates a plunger movable radially of the steering post, detents carried by the plunger, a portion of the lock housing being provided with a curved surface cooperating with the steering post to form a wedging chamber into which the detents are moved by the turning of the steering post in either direction.

7. The device of claim 6 including means adapted to constantly move said detents away from each other and into wedging position.

8. In a steering post lock for automobiles of the type in which a revolving cylinder lock operates a plunger movable radially of the steering post, said plunger having curved walls cooperating with the steering post to form a wedging chamber, detents carried by the plunger, and means adapted to move said detents apart and into engagement with the curved walls of said plunger.

9. The device of claim 8 in which the means for moving said detents apart consists of a spring secured to said plunger.

10. In a device for locking a rotary shaft against turning, a member spaced from the rotary shaft and having two surfaces each diverging from the surface of the shaft and forming therewith a pair of opposed wedging chambers, a detent adapted to contact with the surface of the shaft and to be moved by such contact into wedging relation to one or the other of the wedging chambers depending upon the direction of rotation of the shaft, means for causing relative movement of the detent and the walls of the wedging chamber so as to prevent all wedging action, the detent in unlocked position being entirely out of contact with the rotating shaft and in locking position being spring pressed against the rotating shaft, and means for locking the parts in free or in wedging position.

11. In a device for locking a rotary shaft against turning, a member spaced from the rotary shaft and having two surfaces each diverging from the surface of the shaft and forming therewith a pair of opposed wedging chambers, a detent comprising a roller adapted to contact with the surface of the shaft and to be moved by such contact into wedging relation to one or the other of the wedging chambers depending upon the direction of rotation of the shaft, means for causing relative movement of the detent and the walls of the wedging chamber so as to prevent all wedging action, and means for locking the parts in free or in wedging position, said locking means comprising a spring pressed bolt to which the said roller is loosely pivoted.

12. In a device for locking a rotary shaft against turning, a member spaced from the rotary shaft and having two surfaces each diverging from the surface of the shaft and forming therewith a pair of opposed wedging chambers, a detent adapted to contact with the surface of the shaft and to be moved by such contact into wedging relation to one or the other of the wedging chambers depending upon the direction of rotation of the shaft, a rotating cylinder lock for causing relative movement of the detent and the walls of the wedging chamber so as to prevent all wedging action, said movement of the detent being radially away from the axis of the shaft, and means for locking the parts in free or in wedging position.

13. In a device for locking a rotary shaft against turning, a member spaced from the rotary shaft and having two surfaces each diverging from the surface of the shaft and forming therewith a pair of opposed wedging chambers, a detent comprising a roller loosely carried by a spring pressed plunger, said roller adapted to contact with the surface of the shaft and to be moved by such contact into wedging relation to one or the other of the wedging chambers depending upon the direction of rotation of the shaft, means for causing relative movement of the detent and the walls of the wedging chamber so as to prevent all wedging action, and means for locking the parts in free or in wedging position, said locking means retracting the plunger against its spring to lock the parts in said free position.

14. In a device for locking a rotary shaft against turning, a member spaced from the rotary shaft and having two surfaces each diverging from the surface of the shaft and forming therewith a pair of opposed wedging chambers, a detent adapted to contact with the surface of the shaft and to be moved by such contact into wedging relation to one or the other of the wedging chambers depending upon the direction of rotation of the shaft, means for causing relative movement of the detent and the walls of the wedging chamber so as to prevent all wedging action, and means for locking the parts in free or in wedging position, said detent comprising a roller spring pressed into contact with both walls of one of the wedging chambers when locked in said wedging position.

In testimony whereof I affix my signature.

CHARLES N. FAIRCHILD.